2,867,653
PRODUCTION OF ISOPROPENYLACETATE

Franz Büttner and Eduard Enk, Burghausen-Upper Bavaria, Germany, assignors to Wacker-Chemie G. m. b. H., Munich, Germany No Drawing. Application March 27, 1957
Serial No. 648,780

Claims priority, application Germany April 13, 1956

4 Claims. (Cl. 260—488)

The present invention relates to an improved process for producing isopropenylacetate.

Isopropenylacetate is known to be produced by the addition of ketene to acetone. As the acetone reacts in this manner only when in the enol form, the reaction must take place in the presence of a strong acid catalyst having an enolizing effect. Sulfuric acid is generally used. Several other inorganic and organic acids, such as sulfo acids, hydrochloric acid, phosphoric acid, and phosphorus oxychloride, have also been proposed. The conventional methods have considerable disadvantages. Volatile acid reaction products are formed from sulfur-containing acids under the reaction conditions which products contaminate the final product and greatly reduce its stability and its value as, for example, in polymerization. When manufacturing isopropenylacetate, using sulfuric acid as catalyst at the usual reaction temperature, which lies between the boiling point of the acetone and that of the isopropenylacetate, i. e., between 56° C. and 96° C., volatile, acidic organic sulfur compounds are formed by reduction. Although these compounds can be partly condensed during the distillation in a low temperature trap, they cannot be completely separated from the isopropenylacetate. As a result, the isopropenylacetate changes or decomposes after a short time. These changes are apparent from the fact that the ester content decreases, the acid content increases, and the odor becomes unpleasantly pungent. The product is, accordingly, no longer suitable for further use as, for example, for polymerization reactions.

Organic and inorganic sulfo acids, which are not only difficult to obtain but which cost considerably more than sulfuric acid, have the same disadvantages. The by-products formed during the reaction of acetone and ketene in the presence of sulfo acids are also undesirable for other reasons. When one distills the reaction product, unreacted acetone is obtained as the initial distillate, isopropenylacetate is obtained as the second fraction, and a mixture which contains acetic acid anhydride as the major component is obtained as the third fraction. All of the components form colorless distillates, but both the first cut and the third fraction undergo discoloration after a few hours, becoming yellowish brown initially and finally turning a black-brown. The recovered acetone must, therefore, be purified before it is returned to the process.

It is also known that sulfuric acid and sulfo acids not only cause enolization but also cause acetone to undergo condensation to mesityl oxide, phorone, acetone oils and resin-like products. The stronger the acid, the more rapidly these changes occur. For this reason a low acid concentration must be maintained but this results in a lower conversion of the acetone to isopropenylacetate.

Because of these facts, acid substances which produce volatile reaction products or are themselves volatile, such as hydrochloric acid or acid chlorides, are poorly suited for the production of isopropenylacetate.

Hydrochloric acid as a volatile acid is not suitable for the further reason that it cannot be quantitatively separated from the very reactive isopropenylacetate formed.

What is needed is a non-volatile, strong acid which is stable under the reaction conditions, which catalyzes the enolization but not the condensation of the acetone and which produces no volatile reduction and reaction products.

The intermediate reaction which defines the speed of the process is the enol formation and on this partial reaction there depends not only the conversion and yield but also the possibility of continuous operation of the process.

The object of this invention is the provision of an improved process for producing isopropenylacetate in which polyphosphoric acid is used as the strongly acid catalyst. This acid does not yield volatile substances under the conditions employed for the production of isopropenylacetate, it exceeds the catalytic effect of the sulfuric acid and is also more easily obtained and less costly than organic or inorganic sulfo acids. The result obtained with polyphosphoric acid is quite unexpected because the simple phosphoric acids are not suitable. Neither with concentrated 85% phosphoric acid nor with crystallized phosphoric acid have satisfactory results been obtained. With both of these acids the enolization of the acetone is too slow so that the conversion of the acetone remains low in spite of longer reaction periods, while the undesirable side reactions, such as the formation of diketenes and resins, are favored. Though isopropenyl-acetate can be obtained by using phosphoric acid, the low conversion of acetone and ketene and the useless by-products which result and which are difficult to separate as, for example, diketene and its derivatives, make this method uneconomical. Polyphosphoric acid increases the reaction velocity so greatly that continuous operation is possible with a good acetone conversion even when only a single reaction system is used.

Polyphosphoric acid is produced in a simple fashion by dissolving phosphorus pentoxide in commercial concentrated 85% phosphoric acid. The structure of this compound has not yet been clearly established. It is, however, fundamentally different from ordinary concentrated phosphoric acid and from crystallized phosphoric acid.

The concentration of the polyphosphoric acid has only little effect on the yield. A concentration between 0.5 and 2.5 percent by weight based on the acetone present is particularly suitable; however, it has been found that smaller and greater concentrations are also effective.

When one operates in step-wise fashion and pure acetone is employed, the reaction commences at a temperature of 56° C. and rises, when all acetone has reacted, to a temperature of 96° C., which is the boiling point of the isopropenylacetate. The rate at which the temperature increases is a convenient measure of the progress of the reaction and makes possible a comparison with other catalysts.

To operate continuously the reaction vessel is initially filled with a mixture of acetone and isopropenylacetate, the boiling point of which produces the desired reaction temperature, which is usually 75° C. to 85° C. Acetone is added at the same rate as it reacts with ketene so that a mixture of isopropenylacetate and acetone of constant composition is discharged at a constant reaction temperature.

The molar ratio of acetone and ketene is approximately one to one because there is no substantial aldol condensation of the acetone, which is evident by the almost identical yields of acetone and ketene. With the conventional catalysts an excess of acetone was needed; when using sulfuric acid from 0.7 to 0.8 mol of ketene was recommended for each mol of acetone employed because a part of the acetone was consumed by side reactions and enolization of the acetone proceeds more slowly than the addition of ketene.

The isopropenylacetate which is produced using polyphosphoric acid as the catalyst does not undergo any changes when stored several months. It is not necessary to add polymerization inhibitors during the reaction. The acetone recovered from the process does not change color and can be used again without purification.

Example 1

169 grams of 85.5% phosphoric acid ($D^{20}=1.695$) are gradually mixed, while stirring and cooling, with 198 grams of phosphorus pentoxide. This mixture is heated on a boiling water bath for three hours while stirring by excluding of moisture. There is obtained a clear, viscous acid of phosphorus which contains 82.5% by weight $P_2O_5$ and is readily fluid at 50° C. The polyphosphoric acid thus obtained is hygroscopic and reacts only slowly with water so that it is quite safe to handle. Into 406 grams (7 mols) of acetone there are dissolved, with stirring, 10 grams of this polyphosphoric acid, equivalent to 2.46% by weight of the acetone employed, and the mixture heated to boiling. Over about four and one-half hours there are added to the above mixture, while stirring vigorously, 284 grams of ketene (6.76 mols) corresponding to an addition of about 62 grams of ketene per hour and a mol ratio of acetone to ketene of 1 to 0.96. The vaporized acetone is condensed by low temperature cooling and is returned to the reaction vessel by a siphon arrangement. The boiling point of the reaction mixture rises by about 6.76° C. per hour and at the completion of the reaction is 85° C. The temperature of the heating bath must be gradually increased during the course of the reaction in order to maintain the mixture at the boiling point. The reaction product is fractionally distilled under vacuum and the following is obtained:

| Fraction | Boiling point range | Weight in grams | Composition, percent by weight | | | |
|---|---|---|---|---|---|---|
| | | | Acetone | Isopropenyl acetate | Acetic acid | Acetic anhydride |
| (a) | 31–68° C. at 300 mm | 88.2 | 91.8 | 7.2 | 0.03 | |
| (b) | 55–60–70° C. at 200 mm | 456.6 | 0.2 | 99.3 | 0.1 | |
| (c) | 50–80–90° C. at 100 mm | 72.6 | | 3.9 | 2.3 | 90.9 |

A total of 463 grams of isopropenyl acetate together with 83 grams of unreacted acetone are obtained, the isopropenyl acetate being produced at a rate of 101 grams per hour. The acetic anhydride in fraction (c) can be purified by a second distillation so that the ketene equivalent of this acetic anhydride, which is 54.5 grams of ketene, can be considered as recovered ketene in calculating or determining the yield. On the basis of this assumption, the following values are obtained; the conversion calculated on the basis of the acetone reacted is 66.1%, the conversion calculated on the basis of the ketene reacted is 68.5%. The yield calculated on the basis of the acetone consumed or used up is 83.1% and on the basis of the ketene which is consumed or used up, the yield is 84.7%.

Example 2

A mixture of 406 grams of acetone and 5 grams of polyphosphoric acid (1.2% by weight of the acetone employed) are reacted with ketene in the manner described in Example 1. The reaction is carried out for about five hours and the amount of ketene employed is 291 grams (6.93 mols) which corresponds to the addition of about 59 grams per hour, and to a mol ratio of acetone to ketene of 1 to 0.99. The reaction is halted when the boiling point of the reaction product reaches 80° C., the boiling point rising at a rate of about 5° C. per hour. After working up the product, there are obtained 445 grams of isopropenyl acetate, 113 grams of acetone and 55.5 grams of acetic anhydride, which corresponds to 46 grams of ketene. The isopropenyl acetate was formed at a rate of 90.5 grams per hour. The results obtained are:

| | Based on acetone | Based on ketene |
|---|---|---|
| Percent conversion | 63.6 | 64.2 |
| Percent by weight yield | 88.1 | 76.2 |

Example 3

Ketene is added to a mixture of 1300 grams of acetone and 4 grams of concentrated sulfuric acid heated under reflux at the rate of 63 grams per hour. After six and one-half hours, the reaction product is fractionally distilled and there are obtained 316 grams of isopropenyl acetate and 1071 grams of unreacted acetone, which corresponds to a yield of isopropenyl acetate based on the acetone of 80%. In all, 229 grams of acetone are converted, of which 183 grams are reacted with ketene to form isopropenyl acetate and 46 grams, which is about 20% of the acetone employed, are reacted to form higher acetone condensation products such as resins. The rate at which the isopropenyl acetate is produced is about 48.6 grams per hour, and the acetone conversion is 17.6%.

Example 4

406 grams of acetone were reacted with 5.58 grams of 85% phosphoric acid, which is 1.4% on the weight of the acetone, and heated for five and one-half hours under reflux while adding ketene. A total of 380 grams of ketene (9.05 mols) are added which corresponds to a molecular ratio of acetone to ketene of 1 to 1.29. The boiling point of the mixture increases during the course of the reaction by about 1.38° per hour and at the completion of the reaction is 61.6° C. By working up the product in the usual way where is obtained 184 grams of isopropenyl acetate (a production of 33.5 grams per hour and a yield of 83.4%), 278 grams of acetone and 39.5 grams of a mixture of 25.7 grams of acetic anhydride and 13.8 grams of diketene. The acetone conversion corresponds to 26.3% and the ketene conversion to 20.3%.

Example 5

5 grams of crystallized phosphoric acid are dissolved in 406 grams of acetone and over five and one-half hours with strong stirring, 325 grams (7.74 mols) of ketene are introduced. The boiling point of the solution does not increase during the course of the reaction and at the end of the reaction is 55.3° C. By distillation there is obtained 122 grams of isopropenyl acetate, 312.5 grams of acetone and 52.8 grams of a mixture consisting of 33.8 grams of acetic anhydride, 17.4 grams of diketene and 1.6 grams of acetic acid. Of the acetone employed, 17.4% is converted to isopropenyl acetate and of the ketene added, 15.7% reacts to form this unsaturated ester. The rate of production of the isopropenyl acetate is 22.2 grams per hour.

Example 6

Into a reaction vessel equipped with a stirrer, thermometer and reflux condenser are introduced a mixture of 200 grams of isopropenyl acetate and 240 grams of acetone in which 2.4% by weight of polyphosphoric acid is dissolved. The mixture is heated to boiling and ketene is introduced at a rate of 49 grams per hour. The acetone present in the gaseous by products of the reaction is separated by low temperature cooling and the residue is passed through an absorption column filled with acetic acid where the ketene present reacts with the acetic acid to form acetic anhydride. The boiling point of the reaction mixture increases in three hours from an initial temperature of 64° C. to 78° C. At this point a mixture of acetone with 2.4% polyphosphoric acid is introduced at a rate of 82–83 ml. per hour and the corresponding amount of reaction product is continually removed in a condenser. By carrying out the reaction in this fashion the reaction temperature remains at about 77–78° C. In twelve and one-half hours 865 grams of acetone are introduced, in which amount there is included the acetone of the initial charge, and 1523 grams of reaction product are obtained which, through distillation, is separated into 785 grams of isopropenylacetate, 367 grams of acetone and 84 grams of acetic anhydride. Accordingly, 52.6% of the acetone is converted to isopropenylacetate with a yield of 91.4%.

What we claim is:

1. In a process for the production of isopropenylacetate by reacting acetone and ketene, the step which comprises carrying out said reaction in the presence of polyphosphoric acid as catalyst.

2. In a process for the production of isopropenylacetate by reacting acetone and ketene, the step which comprises carrying out said reaction in the presence of polyphosphoric acid as catalyst, with the ketene and acetone being reacted in substantially equimolecular ratio.

3. Process for the production of isopropenylacetate, which comprises introducing acetone, isopropenylacetate and a polyphosphoric acid catalyst into a reaction zone, heating the mixture to a temperature of 56° C. to 96° C., continuously introducing ketene and a mixture of acetone and polyphosphoric acid into the reaction zone and continuously distilling off isopropenylacetate from the reaction mixture in the reaction zone.

4. Process for the production of isopropenylacetate, which comprises introducing acetone, isopropenylacetate and a polyphosphoric acid catalyst into a reaction zone, heating the mixture to a temperature of from 75 to 85° C., continuously introducing ketene and a mixture of acetone and polyphosphoric acid into the reaction zone and continuously distilling off isopropenylacetate from the reaction mixture in the reaction zone.

References Cited in the file of this patent

UNITED STATES PATENTS

| 2,481,669 | Hull et al. | Sept. 13, 1949 |
| 2,766,311 | Mayer et al. | Oct. 9, 1956 |

FOREIGN PATENTS

| 517,920 | Canada | Oct. 25, 1955 |